(12) United States Patent
She et al.

(10) Patent No.: US 8,467,339 B2
(45) Date of Patent: Jun. 18, 2013

(54) COOPERATIVE MULTI-CELL TRANSMISSION METHOD

(75) Inventors: Xiaoming She, Beijing (CN); Jingxiu Liu, Beijing (CN); Lan Chen, Beijing (CN)

(73) Assignee: NTT DoCoMo, Inc., Tokyo (JP)

(*) Notice: Subject to any disclaimer, the term of this patent is extended or adjusted under 35 U.S.C. 154(b) by 759 days.

(21) Appl. No.: 12/537,807

(22) Filed: Aug. 7, 2009

(65) Prior Publication Data

US 2010/0039951 A1  Feb. 18, 2010

(30) Foreign Application Priority Data

Aug. 11, 2008  (CN) .......................... 2008 1 0131373

(51) Int. Cl.
*H04W 4/00* (2009.01)
(52) U.S. Cl.
USPC ............ 370/329; 370/332; 370/330; 370/331
(58) Field of Classification Search
None
See application file for complete search history.

(56) References Cited

U.S. PATENT DOCUMENTS

| | | | |
|---|---|---|---|
| 7,069,009 B2* | 6/2006 | Li et al. ................... | 455/446 |
| 7,209,460 B2* | 4/2007 | Fitzek et al. ............... | 370/329 |
| 7,477,622 B2* | 1/2009 | Attar et al. ................. | 370/329 |
| 7,929,995 B2* | 4/2011 | Cheng et al. ............... | 455/562.1 |
| 8,027,407 B2* | 9/2011 | Papadopoulos .............. | 375/299 |
| 8,031,795 B2* | 10/2011 | Pan et al. ................... | 375/267 |
| 8,059,732 B2* | 11/2011 | Papadopoulos et al. ....... | 375/260 |
| 2003/0026348 A1* | 2/2003 | Llang et al. ................ | 375/267 |
| 2003/0139194 A1* | 7/2003 | Onggosanusi et al. ........ | 455/506 |
| 2004/0141466 A1* | 7/2004 | Kim et al. .................. | 370/252 |
| 2004/0171357 A1* | 9/2004 | Lobinger et al. ............. | 455/101 |
| 2005/0123004 A1* | 6/2005 | Lechleider et al. ........... | 370/529 |
| 2005/0243835 A1* | 11/2005 | Sharma et al. ............. | 370/395.42 |
| 2006/0120477 A1* | 6/2006 | Shen et al. ................. | 375/267 |
| 2007/0230324 A1* | 10/2007 | Li et al. .................... | 370/204 |
| 2007/0280175 A1* | 12/2007 | Cheng et al. ............... | 370/338 |
| 2008/0137635 A1* | 6/2008 | Pan et al. ................... | 370/345 |
| 2008/0219194 A1* | 9/2008 | Kim et al. .................. | 370/310 |
| 2009/0046008 A1* | 2/2009 | Murakami et al. ............ | 342/373 |

(Continued)

OTHER PUBLICATIONS

Kim, et al., "Multi-Cell Cooperative Transmission", IEEE Conference Record of the Forty-First Asilomar Conference on Signals, Nov. 4, 2007, pp. 448-452, Piscataway, New Jersey, USA.
Lee, et al., "Channel allocation considering the interference range in multi-cell OFDMA downlink systems", 2007, 6 pgs.

(Continued)

*Primary Examiner* — Warner Wong
*Assistant Examiner* — Dung B Huynh
(74) *Attorney, Agent, or Firm* — Blakely, Sokoloff, Taylor & Zafman LLP

(57) ABSTRACT

The present invention provides a cooperative multi-cell transmission method that can be utilized to implement cooperative transmission in a virtual cell. Sectors composing the virtual cell are real cells and/or full sectors in real cells, any sector among the sectors composing the virtual cell is physically located adjacent to at least one of the other sectors, and each sector of the virtual cell corresponds to a real transmitting node respectively. The method includes: acquiring channel state information between any user and at least one of real transmitting nodes by a main information processing node; performing user scheduling and real transmitting node scheduling based on the channel state information by the main information processing node; and cooperatively transmitting data of one or more scheduled users based on the channel state information by one or more scheduled real transmitting nodes. The method according to an embodiment of the present invention reduces the interference and enhances the system spectral efficiency.

8 Claims, 5 Drawing Sheets

U.S. PATENT DOCUMENTS

| | | | |
|---|---|---|---|
| 2009/0046570 A1* | 2/2009 | Sarkar et al. | 370/203 |
| 2009/0046582 A1* | 2/2009 | Sarkar et al. | 370/230.1 |
| 2009/0196174 A1* | 8/2009 | Ji | 370/230.1 |
| 2009/0232074 A1* | 9/2009 | Yang et al. | 370/329 |
| 2009/0268657 A1* | 10/2009 | Alexiou et al. | 370/315 |
| 2010/0027471 A1* | 2/2010 | Palanki et al. | 370/328 |
| 2010/0034146 A1* | 2/2010 | Hou et al. | 370/328 |
| 2010/0034151 A1* | 2/2010 | Alexiou et al. | 370/329 |
| 2010/0035627 A1* | 2/2010 | Hou et al. | 455/452.2 |
| 2010/0157874 A1* | 6/2010 | Lin et al. | 370/315 |
| 2011/0103339 A1* | 5/2011 | Kim et al. | 370/329 |
| 2011/0134868 A1* | 6/2011 | Lee et al. | 370/329 |

OTHER PUBLICATIONS

Papadogiannis, et al., "A Dynamic Clustering Approach in Wireless Networks with Multi-Cell Cooperative Processing", IEEE International Conference on Communications, May 19, 2008, pp. 4033-4037, Piscataway, New Jersey, USA.

"Coordinated multi-cell transmission for LTE-Advanced downlink", 3GPP TSG RAN WG1 Meeting #54, Aug. 18, 2008, Jeju, South Korea.

European Search Report for corresponding European Patent Application No. 09004762.2-2412, Dec. 1, 2009, 3 pgs.

European Office Action dated Oct. 8, 2012; EP Patent Application No. 09004762.2, 6 pages.

* cited by examiner

COOPERATIVE MULTI-CELL TRANSMISSION METHOD

PRIORITY

The present application claims priority to and incorporates by reference the entire contents of Chinese patent application, No. 200810131373.7, filed in China on Aug. 12, 2008.

FIELD OF THE INVENTION

The present invention relates to a multi-cell cooperation technology in a field of cellular communication system, and especially to a cooperative multi-cell transmission method and a base station, for reducing inter-cell interference and providing higher spectral efficiency.

BACKGROUND

A cellular communication system is an interference limited system. Since identical spectral resources are reused in adjacent or close-by cells, system performance is restricted by inter-cell signal interferences to a large extent. A future cellular communication system is required to provide higher spectral efficiency and cell-edge throughput, while inter-cell interference (ICI) must be reduced in order to achieve this goal.

In-depth research on how to reduce inter-cell interference has been done in the current process of standardization for LTE (long term evolution), and a so-called "loose" cooperation mode has been basically agreed to be adopted, which is to exchange some simple information through an X2 interface among cells in order to achieve cooperation on resources of adjacent cells (transmitting power, resource blocks used and so on) and thereby achieving the goal of reducing inter-cell interference. Since the information transmission speed that can be admitted over X2 interface is relatively low and the time delay of information exchange is relatively big, the system performance gain induced by adopting this inter-cell "loose" cooperation mode is very limited.

Compared with the inter-cell "loose" cooperation, a more effective cooperation mode is a "tight" cooperation, that is, inter-cell joint signal transmission. Inter-cell "tight" cooperation mode can transform the signal interference among conventional cells that do not adopt cooperation into a useful signal, and thereby enhances the system performance effectively. For the detailed implementation of the technique, please refer to M. K. Karakayali, etc. "Network coordination for spectrally efficient communication in cellular systems" IEEE wireless commun. Mag, August 2006.

However, current research on "tight" cooperation is still in the theoretical research phase, and it has not been able to present a practical and feasible method yet against requirements for a practical system design, such as signaling overhead, implementation complexity and so on.

SUMMARY OF THE INVENTION

A cooperative multi-cell transmission method is described. In one embodiment, the cooperative multi-cell transmission method comprises acquiring channel state information between any user and at least one of real transmitting nodes by a main information processing node; performing user scheduling and real transmitting node scheduling based on the channel state information by the main information processing node; and cooperatively transmitting data of one or more scheduled users based on the channel state information by one or more scheduled real transmitting nodes.

DETAILED DESCRIPTION OF THE INVENTION

Figure 1:
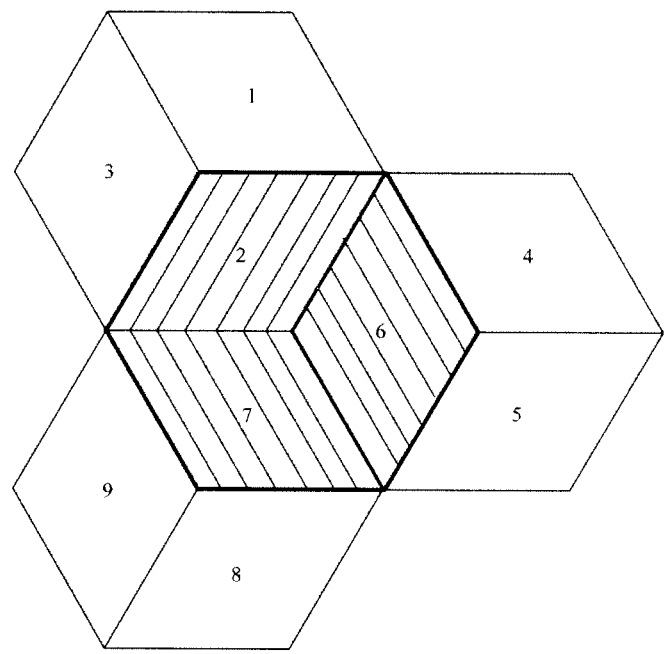
FIG. 1-FIG. 4 are schematic diagrams showing a constitution of a virtual cell according to an embodiment of the present invention.

A cooperative multi-cell transmission method for reducing inter-cell interference and providing higher spectral efficiency is described.

To achieve this, in one embodiment, the present invention includes a cooperative multi-cell transmission method, wherein the method is used to implement cooperative transmission in a virtual cell, sectors composing the virtual cell are real cells and/or full sectors of real cells, any sector among the sectors composing the virtual cell is physically located adjacent to at least one of the other sectors, and each sector of the virtual cell corresponds to a real transmitting node respectively, and the cooperative multi-cell transmission method comprises:

acquiring channel state information between any user and at least one of real transmitting nodes by a main information processing node;

performing user scheduling and real transmitting node scheduling based on the channel state information by the main information processing node; and cooperatively transmitting data of one or more scheduled users based on the channel state information by one or more scheduled real transmitting nodes.

In the aforementioned method, physical locations of the sectors composing the virtual cell are adjacent to each other.

In the aforementioned method, the at least one of the real transmitting nodes is determined by:

acquiring average SINRs over channels between the real transmitting nodes and one or more users;

selecting a real transmitting node with a maximum average SINR from the real transmitting nodes;

from the real transmitting nodes excluding the real transmitting node with the maximum average SINR, selecting real transmitting nodes with an average SINR higher than a first threshold, or selecting real transmitting nodes for which absolute values of differences between the average SINRs and the maximum SINR are lower than a second threshold.

In the aforementioned method, acquiring the channel state information between any user and at least one of the real transmitting nodes comprises:

for a frequency division duplex system, receiving from any user the channel state information between any user and at least one of the real transmitting nodes acquired based on a downlink channel;

for a time division duplex system, acquiring the channel state information between any user and at least one of the real transmitting nodes based on an uplink channel estimation.

In the aforementioned method, the step of performing the user scheduling and real transmitting node scheduling based on the channel state information by the main information processing node comprises:

determining all possible working mode combinations of the real transmitting nodes;

determining a user scheduling result corresponding to each of the possible working mode combinations of the real transmitting nodes based on the channel state information between any user and at least one of the real transmitting nodes;

calculating a system throughput or weighted throughput corresponding to each of the possible working mode combinations of the real transmitting nodes based on the channel state information between any user and at least one of the real transmitting nodes and the user scheduling result;

selecting one or more real transmitting nodes corresponding to the working mode combination of the real transmitting nodes with the maximum system throughput or weighted throughput as the scheduled real transmitting nodes, and making one or more users in the user scheduling result corresponding to the working mode combination of the real transmitting nodes with the maximum system throughput or weighted throughput as the scheduled users.

In the aforementioned method, performing the user scheduling and real transmitting node scheduling based on the channel state information by the main information processing node comprises:

constructing a composite channel matrix between a preset fixed number of real transmitting nodes and a preset number of user combinations, and when no channel state information between any user and the real transmitting node is acquired from acquiring the channel state information, a corresponding element in the composite channel matrix being substituted by 0 or a long-term channel characteristic;

calculating a pre-coding matrix and a system throughput or weighted throughput corresponding to the user combinations based on the composite channel matrix;

repeating the constructing and the calculating, and calculating the system throughput or weighted throughput for every possible user combination; and selecting users in the user combination with the maximum system throughput or weighted throughput as the scheduled users, and the preset number of real transmitting nodes as the scheduled real transmitting nodes.

An embodiment of the present invention has the following beneficial effects. The method according to an embodiment of the present invention shapes the original cells/sectors and the cells or sectors interfering with the original cells/sectors into new virtual cells, and further performs cooperative transmission. In the mode of cooperative transmission, primary interference is eliminated and the spectral efficiency of the system is enhanced.

In a cooperative multi-cell transmission method according to an embodiment of the present invention, a new virtual cell is made up of sectors of existing cells. The virtual cell comprises multiple sectors and each sector corresponds to a base station. The multiple base stations are used to work cooperatively based on certain rules to reduce inter-cell interference and to provide higher spectral efficiency.

In a specific embodiment of the present invention, the sectors making up of the virtual cell can be sectors of a real base station, and can also be a real cell, which will be described in detail hereafter.

An embodiment of the present invention can be applied to a down-link transmission of wireless network, such as the down-link of a cellular network, the down-link of a distributed antenna system and so on. At the same time, high speed information exchange can be implemented between a transmitting node and a main information processing node.

If the transmitting node is a RRE (Remote Radio Equipment), it is in charge of signal transmitting and receiving. RRE is connected with the main processing node (such as a base station, a central unit, etc.) through an optical fiber in order to implement information exchange.

In the description of the present invention hereinafter, detailed description will be given based on a scenario of aforementioned RRE and base station.

In order to make an embodiment of the present invention better understood, a detailed description on the virtual cell according to the present invention will be given before describing in detail the embodiment of the present invention.

The virtual cell is an area where the joint signal transmission and user scheduling are performed in the multi-cell cooperation of the present invention. It defines the cooperation scope among the RREs serving users, that is, which RREs will cooperate and which users will be served.

In one embodiment of the present invention, the selection of a virtual cell is related to the number of sectors included in each real cell and antenna angles in each sector. However, in the description of the embodiment of the present invention, the sectors composing the virtual cell meet the following conditions:

1. the sectors composing the virtual cell are full sectors in real cells;
   2. physical locations of the sectors composing the virtual cell are adjacent to each other; and
   3. each sector of the virtual cell corresponds to a real transmitting node respectively.

The aforementioned virtual cell will be illustrated in detail hereinafter.

As shown in FIG. 1, a real cell includes 3 sectors, which are:

the real cell composed by sectors 1, 2 and 3;
   the real cell composed by sectors 4, 5 and 6; and
   the real cell composed by sectors 7, 8 and 9.

The antenna direction of each sector aims at the cell corner, and the virtual cell achieved under this condition is shown in FIG. 1. The parts with a slash as shown in FIG. 1 compose the virtual cell, which is composed by sectors 2, 6 and 7.

Figure 2:
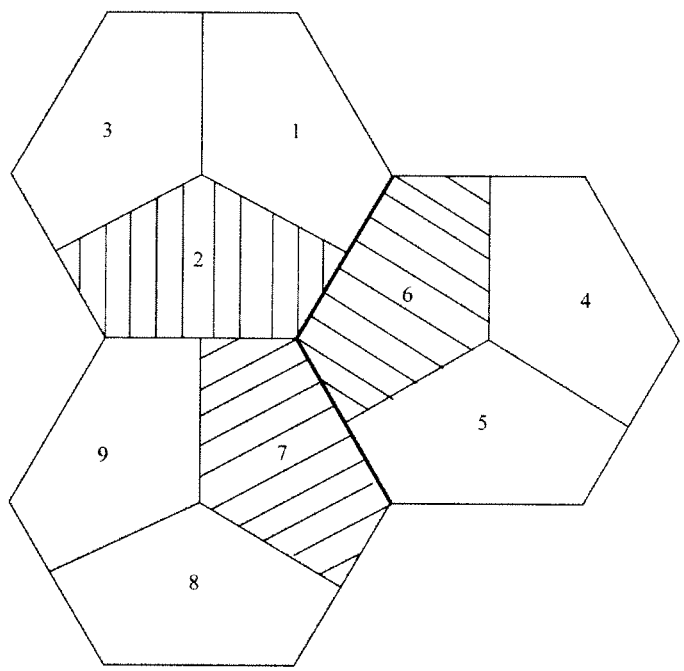

As shown in FIG. 2, a real cell includes 3 sectors, which are:

The real cell composed by sectors 1, 2 and 3;
   The real cell composed by sectors 4, 5 and 6;
   The real cell composed by sectors 7, 8 and 9.

The antenna direction of each sector aims at the cell border, and the virtual cell achieved under this condition is shown in FIG. 2. The parts with a slash compose the virtual cell, which is composed by sectors 2, 6 and 7.

Figure 3:
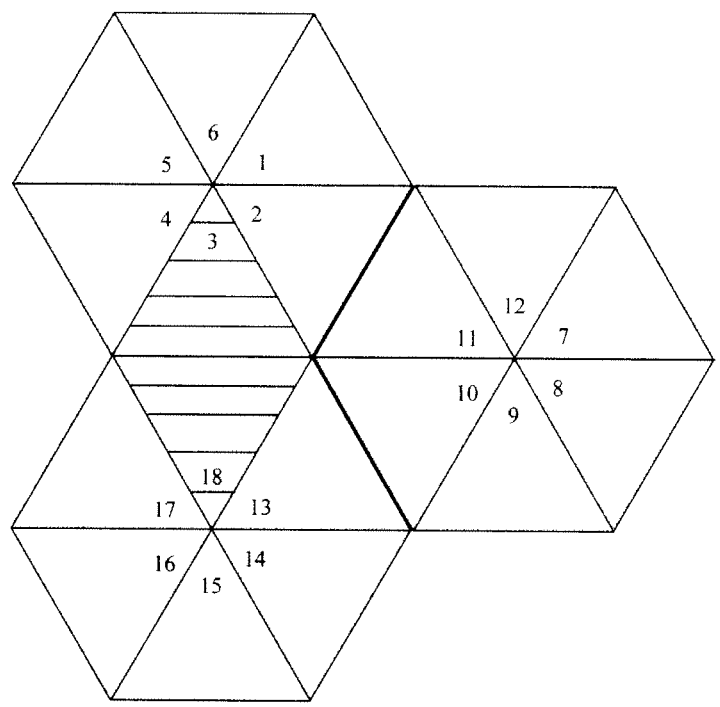

As shown in FIG. 3, a real cell includes 6 sectors, which are:

the real cell composed by sectors 1, 2, 3, 4, 5 and 6;
   the real cell composed by sectors 7, 8, 9, 10, 11 and 12; and
   the real cell composed by sectors 13, 14, 15, 16, 17 and 18.

The antenna direction of each sector aims at the cell border, and the virtual cell achieved under this condition is shown in FIG. 3. The parts with horizontal lines compose the virtual cell, which is composed by sectors 3 and 18.

Figure 4:
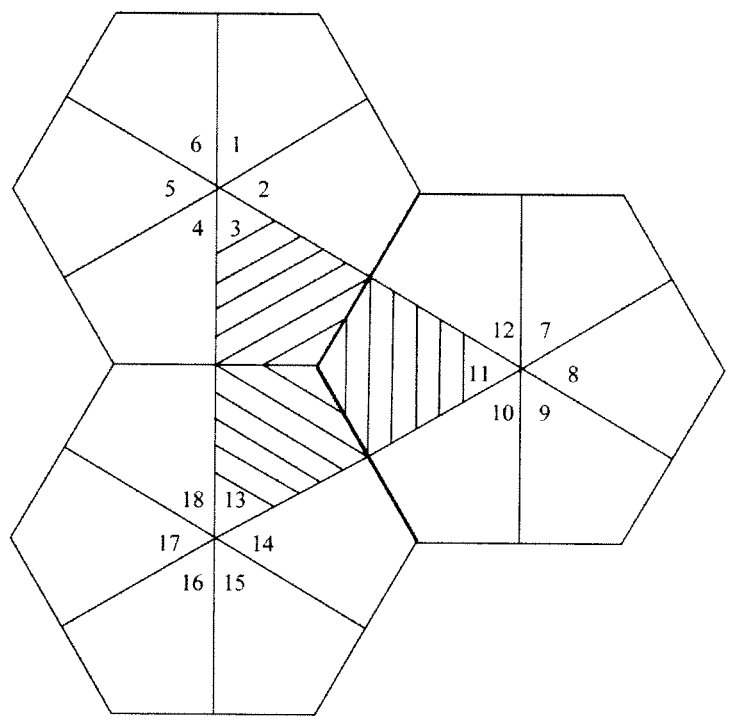

As shown in FIG. 4, a real cell includes 6 sectors, which are:
- the real cell composed by sectors 1, 2, 3, 4, 5 and 6;
- the real cell composed by sectors 7, 8, 9, 10, 11 and 12; and
- the real cell composed by sectors 13, 14, 15, 16, 17 and 18.

The antenna direction of each sector aims at the cell corner, and the virtual cell achieved under this condition is shown in FIG. 4. The parts with a slash compose the virtual cell, which is composed by sector 3, 11 and 13.

It is illustrated in detail in the embodiment of the present invention the selection of the virtual cell by taking examples of the aforementioned four conditions. No detailed illustration will be given for the real cells in other forms.

The aforementioned description is given by taking examples of the condition that real sectors exist in real cells. However, in the environment without the concept of the sector (which is the condition that adopts omni-antennas), the virtual cell at this time includes several real cells, and the real cells composing the virtual cell need to meet the following requirements:
1. the sectors composing the virtual cell are real cells;
2. physical locations of the real cells with the sectors composing the virtual cell are adjacent to each other; and
3. each real cell with the sectors composing the virtual cell corresponds to a real transmitting node respectively.

Of course the virtual cell can also include both the real cells without sectors and the sectors in other cells with sectors.

Since the only difference between the latter two composing modes of virtual cells and that composing virtual cells with real sectors is that the composing units are different, no more detailed description will be given here.

In the specific description of one embodiment of the present invention hereinafter, the real sectors composing the virtual cell are taken as examples for illustration. But it should be understood that these illustrations are applicable to the condition that the real cells composing the virtual cell too.

In one specific embodiment of one present invention, after the virtual cell is determined, the system can inform the users of the nodes that may perform cooperative transmission for the users based on the pattern of the virtual cell and user locations, and may perform subsequent cooperative transmission process. In the virtual cells in FIG. 1, FIG. 2, FIG. 3 and FIG. 4, there are 3, 3, 2 and 3 transmitting node RREs respectively serving the users, and further detailed illustration will be given later on how to serve.

In one specific embodiment of the present invention, every user needs to transmit channel state information.

After the virtual cell is determined, cooperative transmission process is performed. The cooperative transmission process mainly includes two steps, which are a feedback step and a joint transmission step. The two steps are described in detail respectively.

After the system informs the UEs (user equipments) located in the virtual cell of the RREs that can serve the users, the UEs have acquired the RREs that can perform the cooperative transmission for the UEs.

Since user location corresponds to an average SINR (Signal to Interference and Noise Ratio), that is, the average SINR is determined once the user location is determined, the feedback step of the embodiment of the present invention is performed based on the user location or average SINR channel feedback method.

Figure 5:
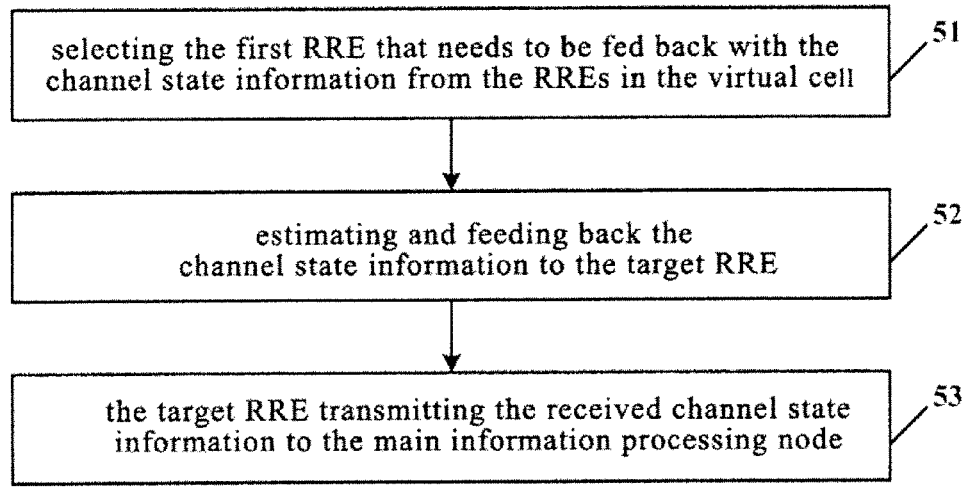
FIG. 5 is a flow chart showing a method according to an embodiment of the present invention.

In one specific embodiment of the present invention, the channel state information needs to be fed back to the RREs, and at this time, the user selects part of the RREs from the RREs serving the user in the order from maximum average SINR to minimum average SINR in order to implement channel state information feedback. The detailed process is shown in FIG. 5, and includes the following steps.

In Step 51, the first RRE that needs to be fed back with channel state information is selected from the RREs in the virtual cell.

After the information of the virtual cell is acquired, firstly all the transmitting RREs in the virtual cell that the user is located in are determined, the average receiving SINR when these RREs transmit signals to the user is calculated, and the RRE with the maximum SINR is selected as a dominant RRE. At the same time, the user also needs to judge whether it needs to feedback the channel from another RRE (for the simplicity of description, it is named as the second RRE in the specific embodiment of the present invention) besides the dominant RRE based on certain criteria.

The judging criteria are shown as following:

Mode 1: The received average SINR of the signal transmitted by the second RRE and the preset RRE selection threshold are compared. If the average SINR is higher than the RRE selection threshold, the channel state information of the corresponding channel needs to be fed back; otherwise the channel state information doesn't need to be fed back.

Mode 2: The absolute value of the difference between the received average SINR of the signal transmitted by the second RRE and the average SINR of the signal transmitted by the dominant RRE is compared with the preset RRE selection threshold. If the absolute value of the difference is lower than the RRE selection threshold, the channel state information of the corresponding channel needs to be fed back. Otherwise the channel state information doesn't need to be fed back.

Briefly, the selection of the aforementioned two modes can be summarized as: selecting preset number of RREs in the order from maximum average SINR to minimum average SINR.

In Step 52, the channel state information is estimated and fed back to the target RRE.

In one specific embodiment of the present invention, two feedback modes can be adopted, and they are described as following.

Mode 1: The target RRE is the dominant RRE, which means to feed back all channel state information between the user and the first RRE to the dominant RRE.

Mode 2: The target RRE is the RRE corresponding to the channel state information, which means to feed back channel state information between the user and the first RRE to the corresponding RRE, and it will be described as following.

It is assumed that that the selected first RREs include RRE A, RRE B and RRE C, then the channel state information of the channel between RRE A and the user is fed back to RRE A by the user, the channel state information of the channel between RRE B and the user is fed back to RRE B by the user, and the channel state information of the channel between RRE C and the user is fed back to RRE C by the user.

At the same time, in one specific embodiment of the present invention, the fed back channel state information is the quantized channel state information, wherein the quantization includes the quantization of channel quality, which is the channel quality information (CQI), and the quantization of channel vector, wherein the existing quantization modes, such as the Channel Vector Quantization (CVQ) and Precoding Vector Quantization (PVQ) and so on, can be adopted as channel vector quantization mode. The detailed quantization process will not be described here.

In Step 53, the RRE that received the channel state information (which is the target RRE) transmits the received channel state information to the main information processing node, for using in joint signal transmission and scheduling.

The aforementioned processing flow is for a frequency division duplex system. While for a time division duplex system, the downlink channel can be obtained by estimating an uplink channel, and therefore the channel feedback is not needed. For the time division duplex system, it is only needed to determine which RREs implement channel estimation, and the processing modes are described as following.

For a certain user, every RRE in the virtual cell calculates the average SINR from the user to the node, and the RRE with the maximum SINR is selected as the dominant RRE.

The user follows one of the criteria below to judge whether other RREs besides the dominant RRE need to implement channel estimation:

Mode 1: The average SINR from the user to another RRE and the preset RRE selection threshold are compared. If the average SINR is higher than the RRE selection threshold, that RRE needs to estimate the channel state information then; otherwise it doesn't need to estimate channel state information.

Mode 2: The absolute value of the difference between the average SINR from the user to another RRE and the average SINR from the user to the dominant RRE is compared with the preset RRE selection threshold. If the absolute value of the difference is lower than the RRE selection threshold, that RRE needs to estimate the channel state information then; otherwise, it doesn't need to estimate channel state information.

Each RRE transmits the channel state information acquired from channel estimation to the main information processing node BS/CU for joint signal transmission and scheduling.

The joint transmission step can be performed after the main information processing node receives the channel state information. It is described in detail later.

In one specific embodiment of the present invention, two modes can be applied in implementing the joint transmission step, and they are described as following.

Mode 1: the number of RREs is not fixed, the RREs participating in the cooperative transmission are determined adaptively.

Under this mode, the joint transmission step includes two sub-steps, which are the scheduling sub-step and the precoding sub-step. They are respectively described as following.

The scheduling sub-step includes the following steps.

In Step A1, all possible combinations of RRE working modes are determined;

Under the condition that there are three RREs (assuming that they are RRE A, RRE B and RRE C), possible combinations of RRE working modes are shown as following.

Combination 1: RRE A, RRE B and RRE C transmit independently;
Combination 2: RRE A transmits independently, and RRE B and RRE C transmit cooperatively;
Combination 3: RRE B transmits independently, and RRE A and RRE C transmit cooperatively;
Combination 4: RRE C transmits independently, and RRE A and RRE B transmit cooperatively;
Combination 5: RRE A, RRE B and RRE C transmit cooperatively.

In Step A2, the user scheduling result corresponding to each RRE working mode combination is determined based on the channel state information transmitted by the user.

Specifically, if a user feeds back the channel state information of the channels between the user and several RREs, the several RREs corresponding to the channel state information will be used to perform transmission to the user, and the RRE working modes includes single RRE transmission, cooperative transmission of two RREs and cooperative transmission of three RREs.

Assume that there are six users in the virtual cell, and they are UE 1, UE 2, UE 3, UE 4, UE 5 and UE 6 respectively, wherein:

UE 1 feeds back the channel state information of the channel between UE 1 and RRE A;
UE 2 feeds back the channel state information of the channel between UE 2 and RRE B;
UE 3 feeds back the channel state information of the channel between UE 3 and RRE A and the channel between UE 3 and RRE B;
UE 4 feeds back the channel state information of the channel between UE 4 and RRE A and the channel between UE 4 and RRE B;
UE 5 feeds back the channel state information of the channel between UE 5 and RRE A, the channel between UE 5 and RRE B, and the channel between UE 5 and RRE C; and
UE 6 feeds back the channel state information of the channel between UE 6 and RRE C.

The above means that UE 1, UE 2 and UE 6 correspond to the single RRE transmission, UE 3 and UE 4 correspond to the cooperative transmission of two RREs, and UE 5 corresponds to the cooperative transmission of three RREs.

Under the aforementioned condition, the scheduling results corresponding to specific combinations are shown as following:

for combination 1, UE 1, UE 2 and UE 6 are scheduled;
for combination 2, no user can be scheduled;
for combination 3, no user can be scheduled;
for combination 4, UE 3, UE 4 and UE 6 are scheduled; and
for combination 5, UE 5 is scheduled.

In Step A3, the system throughput or weighted throughput corresponding to every RRE working mode combination is calculated based on the channel state information fed back by the users scheduled in the user scheduling result corresponding to the RRE working mode combination.

In this step, the system throughput of UE 1, UE 2 and UE 3 scheduled for combination 1, the system throughput of UE 3, UE 4 and UE 6 scheduled for combination 4, and the system throughput of UE 5 scheduled for combination 5 are calculated. Since no user can be scheduled for combination 3 or combination 4, it doesn't need to calculate for them.

In step A4, the RRE working mode combination with the maximum system throughput or weighted throughput is selected from all the RRE working mode combinations based on the calculation result.

In Step A5, MIMO (Multi-input Multi-output) cooperative transmission is performed by utilizing the RRE working mode combination with the maximum system throughput or weighted throughput, the corresponding user scheduling result and channel state information.

Assume that the RRE working mode combination with the maximum system throughput or weighted throughput is combination 4, in which UE 3, UE 4 and UE 6 are schedules, then in Step A5, RRE C transmits data for UE 6 independently, while RRE A and RRE B cooperatively transmit data for UE 3 and UE 4.

It is well known to those skilled in the art as how to do pre-coding based on channel state information and MIMO transmission are, such as Single-user MIMO, Multi-user MIMO, Rank Adaptation, Unitary Matrix Pre-coding, Block Diagonalization and so on. They are not described in detail here.

Mode 2: The number of the RREs is fixed.

The basic idea of the cooperation method with fixed number of RREs is that for any user in the virtual cell, all the RREs or a fixed number of RREs in the virtual cell cooperatively transmit to the user. The implementation method includes the following steps.

In Step B1, a user group, for example with three users, is given, and here the number of users served by the system on the same resource block can be set initially by the system.

In Step B2, the composite channel matrix between the fixed number of RREs and the user group is constructed.

Here, assume that the user combination is UE 1, UE 2 and UE 3, wherein:

UE 1 feeds back the channel state information of the channel between UE 1 and RRE A and the channel between UE 1 and RRE B;

UE 2 feeds back the channel state information of the channel between UE 2 and RRE C; and UE 3 feeds back the channel state information of the channel between UE 3 and RRE A, the channel between UE 3 and RRE B, and the channel between UE 3 and RRE C.

Then the composite channel matrix is constructed as following:

$$H = \begin{bmatrix} H_{1A} & H_{1B} & 0 \\ 0 & 0 & H_{2C} \\ H_{3A} & H_{3B} & H_{3C} \end{bmatrix}.$$

In the above matrix, the rows represent users, the columns represent RREs, and each element represents the channel matrix between corresponding RRE and corresponding user.

For the condition that there is no channel feedback, for example there is no feedback on the channel from RRE C to user 1, the corresponding element in the composite channel matrix is substituted by 0 or long-term channel characteristics. In the specific embodiment of the present invention, it is substituted by 0 for illustration.

In Step B3, the pre-coding matrix and the system throughput or weighted throughput corresponding to the user combination are calculated by utilizing existing methods based on the composite channel matrix.

In Step B4, steps B1-B3 are repeated, the system throughput or weighted throughput for every user combination is calculated, and the user combination with the maximum system throughput or weighted throughput is selected from all the user combinations.

In Step B5, the fixed number of RREs perform MIMO cooperative transmission for the user combination with the maximum system throughput or weighted throughput by utilizing corresponding pre-coding method based on the fed back channel state information.

It is well know to those skilled in the art as how to do pre-coding based on channel state information and MIMO transmission, such as Single-user MIMO, Multi-user MIMO, Rank Adaptation, Unitary Matrix Pre-coding, Block Diagonalization and so on. They are not described in detail here.

Embodiment to the present invention reduces inter-cell interference and further enhances system throughput by selecting real cells to compose virtual cells and then performing RRE cooperative transmission.

As shown in FIG. 1, regarding sector 2, the maximum inter-cell interference comes from sector 6 and sector 7. According to the method in one embodiment of the present invention, sector 6, sector 7 and sector 2 are combined to implement cooperative transmission so that the interference from sector 6 and sector 7 to sector 2 is eliminated, and therefore the inter-cell interference is reduced greatly and the system throughput is enhanced.

As shown in FIG. 2, regarding sector 2, the maximum inter-cell interference comes from sector 6, sector 7 and sector 9. According to the method in one embodiment of the present invention, sector 6, sector 7 and sector 2 are combined to implement cooperative transmission so that the interference from sector 6 and sector 7 to sector 2 is eliminated. In the virtual cell, among all the sectors having the maximum interference to sector 2, sector 9 is the only one left that still induces interference to sector 2, therefore the inter-cell interference is greatly reduced and the system throughput is enhanced.

It also applies to the virtual cells shown in FIG. 3 and FIG. 4, where the inter-cell interferences are both reduced and the system throughputs are both enhanced.

Figure 6:
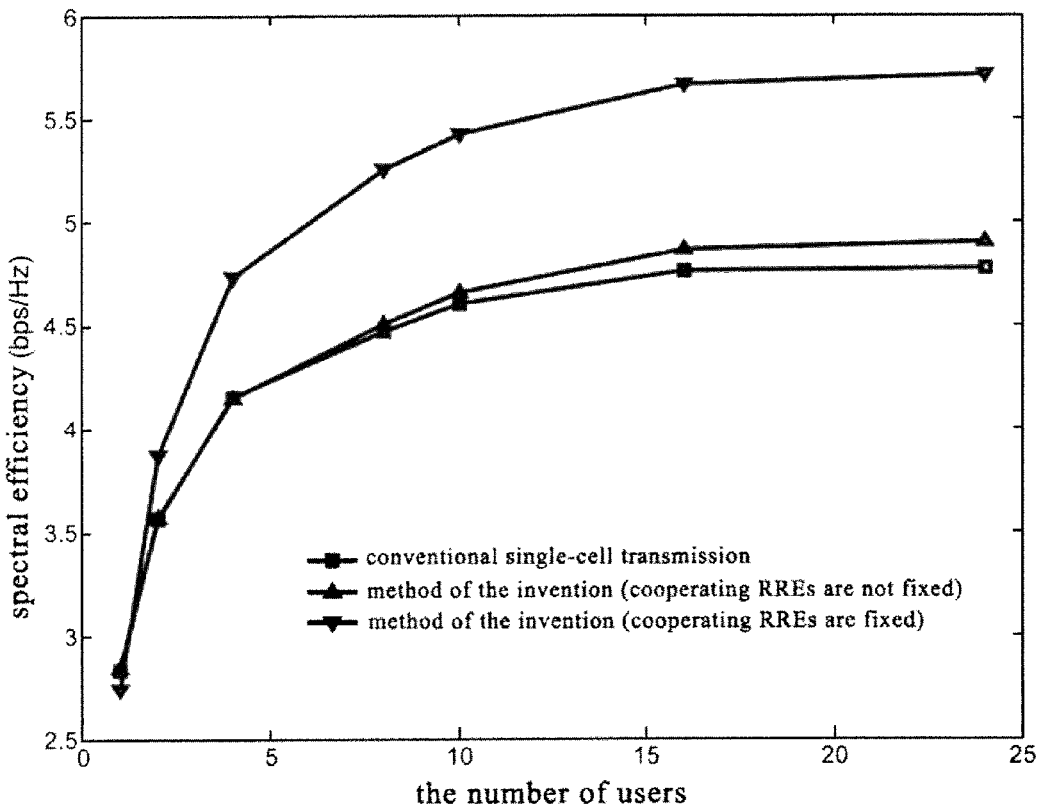
FIG. 6-FIG. 7 are schematic diagrams showing simulations of a method according to an embodiment of the present invention.

FIG. 6 is a schematic diagram showing the simulation by utilizing the method of the embodiment of the present invention. In FIG. 6, the abscissa shows the number of users and the ordinate shows the spectral efficiency (bps/MHz). It can be seen from FIG. 6 that no matter whether the cooperative RREs are in the fixed mode or not, the spectral efficiency of the method according to the embodiment of the present invention shows relatively larger improvement compared with that of the conventional single-cell transmission mode.

Figure 7:
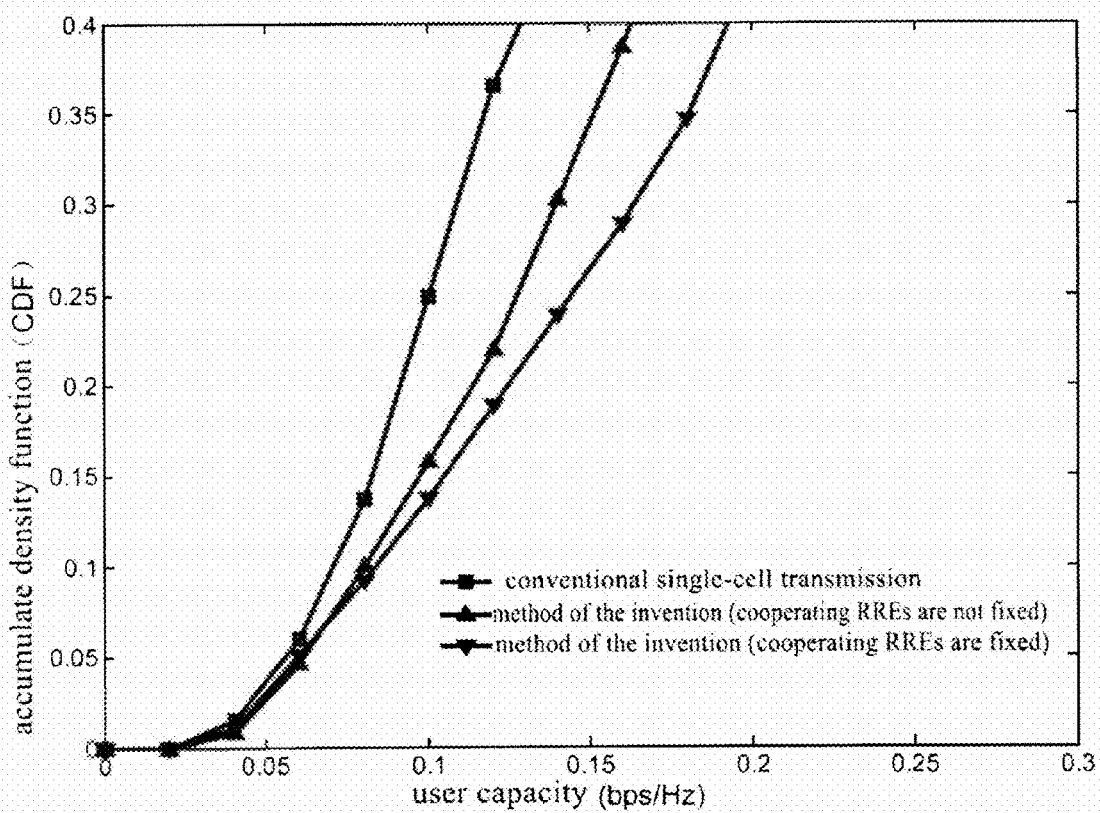

FIG. 7 is another schematic diagram showing the simulation by utilizing the method according to the embodiment of the present invention. In FIG. 7, the abscissa shows the user capacity (bps/Hz) and the ordinate shows the accumulate density function (bps/MHz). It can be seen from FIG. 7 that under the condition that the accumulate density functions are the same, no matter whether the cooperative RREs are in the fixed mode or not, the user capacity of the method according to one embodiment of the present invention shows some improvement compared with that of the conventional single-cell transmission mode. It is especially apparent when the accumulate density function is higher than 0.1.

In the aforementioned description of one embodiment of the present invention, the sectors composing the virtual cell meet the following requirements:

1. the sectors composing the virtual cell are full sectors in real cells;
2. physical locations of the sectors composing the virtual cell are adjacent to each other; and
3. each sector of the virtual cell corresponds to a real transmitting node respectively.

Figure 8:
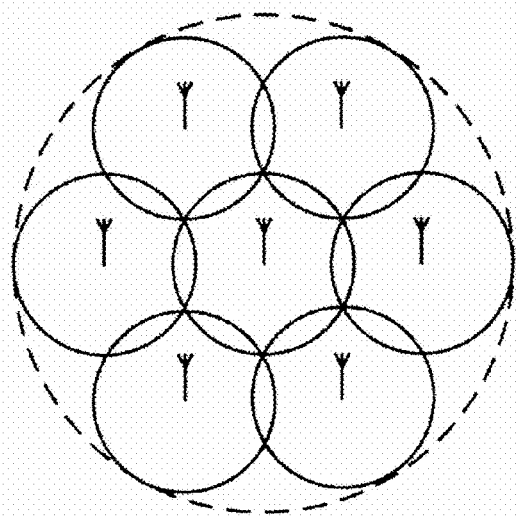
FIG. 8-FIG. 9 are schematic diagrams showing other constitutions of a virtual cell according to an embodiment of the present invention.
Figure 9:
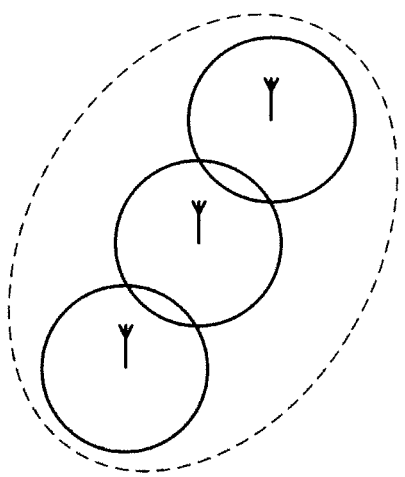

However, physical locations of the sectors composing the virtual cell according to the specific embodiment of the present invention may not be adjacent to each other. It is only required that one sector of the sectors composing the virtual cell is physically located adjacent to at least one of the other sectors, as shown in FIG. 8-FIG. 9. The aforementioned are only preferred embodiments of the present invention. Those skilled in the art may understand that without departing from the spirit of the present invention, there are different variations and modifications which are also within the protection scope of the present invention.

The invention claimed is:

1. A cooperative multi-cell transmission method for implementing cooperative transmission in a virtual cell, wherein sectors composing the virtual cell are one or both of real cells and full sectors of real cells, and further wherein any sector among the sectors composing the virtual cell is physically located adjacent to at least one of the other sectors and each sector of the virtual cell corresponds to a real transmitting node respectively, the cooperative multi-cell transmission method comprising:
  acquiring channel state information between any user and at least one of real transmitting nodes by the main information processing node;
  performing user scheduling and real transmitting node scheduling based on the channel state information by the main information processing node; and
  cooperatively transmitting data of one or more scheduled users based on the channel state information by one or more scheduled real transmitting nodes,
  wherein performing the user scheduling and real transmitting node scheduling based on the channel state information by the main information processing node comprises:
    determining all possible working mode combinations of the real transmitting nodes;
    determining a user scheduling result corresponding to each of the possible working mode combinations of the real transmitting nodes based on the channel state information between any user and at least one of the real transmitting nodes;
    calculating a system throughput or weighted throughput corresponding to each of the possible working mode combinations of the real transmitting nodes based on the channel state information between any user and at least one of the real transmitting nodes and the user scheduling result; and
    selecting one or more real transmitting nodes corresponding to the working mode combination of the real transmitting nodes with the maximum system throughput or weighted throughput as the scheduled real transmitting nodes, and making one or more users in the user scheduling result corresponding to the working mode combination of the real transmitting nodes with the maximum system throughput or weighted throughput as the scheduled users.

2. The method according to claim 1, wherein physical locations of the sectors composing the virtual cell are adjacent to each other.

3. The method according to claim 2, wherein the at least one of the real transmitting nodes is determined by:
  acquiring average signal-to-interference plus noise ratios (SINRs) over channels between the real transmitting nodes and one or more users;
  selecting a real transmitting node with a maximum average SINR from the real transmitting nodes;
  from the real transmitting nodes excluding, the real transmitting node with the maximum average SINR, selecting real transmitting nodes with an average SINR higher than a first threshold, or selecting real transmitting nodes for which absolute values of differences between the average SINRs and the maximum SINR are lower than a second threshold.

4. The method according to claim 3, wherein acquiring the channel state information between any user and at least one of the real transmitting nodes comprises:
  for a frequency division duplex system, receiving from any user the channel state information between any user and at least one of the real transmitting nodes acquired based on a downlink channel; and
  for a time division duplex system, acquiring the channel state information between any user and at least one of the real transmitting nodes based on an uplink channel estimation.

5. A cooperative multi-cell transmission method for implementing cooperative transmission in a virtual cell, wherein sectors composing the virtual cell are one or both of real cells and fall sectors of real cells, and further wherein any sector among the sectors composing the virtual cell is physically located adjacent to at least one of the other sectors, and each sector of the virtual, cell corresponds to a real transmitting node respectively, the cooperative multi-cell transmission method comprising:
  acquiring channel state information between an user and at least one of real transmitting nodes by a main information processing node;
  performing user scheduling and real transmitting node scheduling based on the channel state information by the main information processing node; and
  cooperatively transmitting data of one or more scheduled users based on the channel state information by one or more scheduled real transmitting nodes,
  wherein performing the user scheduling and real transmitting node scheduling based on the channel state information by the main information processing node comprises:
    constructing a composite channel matrix between as preset fixed number of real transmitting nodes and a preset number of user combinations, and when no channel state information between any user and the real transmitting node is acquired from acquiring the channel state information, a corresponding element, in the composite channel matrix being substituted by 0 or a long-term channel characteristic;
    calculating a pre-coding matrix and a system throughput or weighted throughput corresponding to the user combinations based on the composite channel matrix;
    repeating the constructing and the calculating, and calculating the system throughput or weighted throughput for every possible user combination; and
    selecting users in the user combination with the maximum system throughput or weighted throughput as the scheduled users, and the preset number of real transmitting nodes as the scheduled real transmitting nodes.

6. The method according to claim 5, wherein physical locations of the sectors composing the virtual cell are adjacent to each other.

7. The method according to claim 6, wherein the at least one of the real transmitting nodes is determined by:
  acquiring average signal-to-interference plus noise ratios (SINRs) over channels between the real transmitting nodes and one or more users;
  selecting a real transmitting node with a maximum average SINR from the real transmitting nodes;
  from the real transmitting nodes excluding the real transmitting node with the maximum average SINR, selecting real transmitting nodes with an average SINR higher than a first threshold, or selecting real transmitting nodes for which absolute values of differences between the average SINRs and the maximum SINR are lower than a second threshold.

8. The method according to claim 7, wherein acquiring the channel state information between any user and at least one of the real transmitting nodes comprises:
  for a frequency division duplex system, receiving from any user the channel state information between any user and at least one of the real transmitting nodes acquired based on a downlink channel; and for a time division duplex system, acquiring the channel state information between any user and at least one of the real transmitting nodes based on an uplink channel estimation.

* * * * *